(12) United States Patent
Bonnedal et al.

(10) Patent No.: US 6,246,514 B1
(45) Date of Patent: Jun. 12, 2001

(54) SYSTEM WITH OPTICAL AMPLIFIER

(75) Inventors: Dag Bonnedal, Enskede; Gunnar Forsberg, Stockholm; Bengt Johansson, Hägersten; Bo Lagerström, Skärholmen, all of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/254,713

(22) PCT Filed: Sep. 11, 1997

(86) PCT No.: PCT/SE97/01536

§ 371 Date: Aug. 2, 1999

§ 102(e) Date: Aug. 2, 1999

(87) PCT Pub. No.: WO98/11682

PCT Pub. Date: Mar. 19, 1998

(30) Foreign Application Priority Data

Sep. 13, 1996 (SE) .................................................. 9603336

(51) Int. Cl.[7] ....................................................... H01S 3/00
(52) U.S. Cl. ........................... 359/341; 359/124; 359/177
(58) Field of Search ..................................... 359/341, 177, 359/124

(56) References Cited

U.S. PATENT DOCUMENTS

| 4,918,396 | 4/1990 | Halemane et al. . |
| 4,991,229 | 2/1991 | Nelson et al. . |
| 5,467,219 | 11/1995 | Ushirozawa . |
| 5,703,711 | * 12/1997 | Hamada ............................... 359/341 |
| 5,870,217 | * 2/1999 | Itou et al. ............................. 359/179 |
| 5,875,054 | * 2/1999 | Onoda et al. ........................ 359/341 |

FOREIGN PATENT DOCUMENTS

| 0 637 148 | 2/1995 | (EP) . |
| 2 294 170 | 4/1996 | (GB) . |

* cited by examiner

Primary Examiner—Mark Hellner
(74) Attorney, Agent, or Firm—Burns, Doane, Swecker & Mathis, L.L.P.

(57) ABSTRACT

The present invention relates to an optical system comprising firstly an optical amplifier (11), which comprises at least one input and at least one output, secondly a control circuit for regulating the output power of the amplifier (11) with the aid of a feed-forward process demand signal (PF), said control circuit comprising a feed-forward block (14) and a first means (13) for tapping light from the input of the amplifier (11) to the feed-forward block (14). According to the invention, the feed-forward block (14) is arranged to measure the total optical input power.

23 Claims, 3 Drawing Sheets

SYSTEM WITH OPTICAL AMPLIFIER

TECHNICAL FIELD

The present invention relates to a system with optical amplifiers and in particular to a system where the transmitted signals are wavelength division multiplexed (WDM), and to a control process in this system.

THE STATE OF THE ART

Wavelength division multiplexing (WDM) is a technology which permits transmission of a number of optical signals through an optical fibre by using different separated light wavelengths. In this manner, the information carrying capacity can be increased significantly. The capacity depends on the band width of the fibre, the number of the wavelength channels used and how close the wavelength channels can lie to each other in practice. The signal at each wavelength travels through the fibre independently of the other signals, so each signal represents a discrete channel of large band width.

When signals are sent long distances, the signals must be regenerated or amplified at repeated intervals. In the latter alternative, it is possible to use optical amplifiers for example. The optical amplifier differs from its electrical counterpart in that the optical amplifier attempts to keep the output power constant, while the electrical amplifier has a constant amplification.

The fact that the output power is constant presents problems if the number of channels is changed, intentionally or because of faults. It can therefore be desirable to be able to control the output power. It is previously known to control the amplification in an optical amplifier with the aid of pilot tones (see EP 0 637 148 A1). An identifying pilot tone is modulated on each multiplexed wavelength. Each amplifier in the system determines from the pilot tone the total number of wavelengths which are sent and provides a corresponding regulation of the amplification by the amplifier. Either feed-forward control or feedback control can be used. The patent document also indicates that, in addition to counting the number of channels, the amplitude of the pilot tones on the channels can be measured to provide better regulation.

It is also previously known (see GB 2 294 170) to control, in various ways, the amplifier by measuring the total optical power at the amplifier output and comparing it to a reference voltage. This provides a feedback signal which controls the amplifier. Additionally, the number of channels can be counted and the regulation be adjusted with the aid thereof.

It is also known (see U.S. Pat. No. 4,991,229) to control an optical amplifier by measuring the power of only one wavelength channel. This is done by extracting the channel by filtering with the aid of a WDM coupler and detecting it. Otherwise the feedback control is effected as described above.

DESCRIPTION OF THE INVENTION

One problem with previously known technology is that it is difficult to make the feedback sufficiently rapid.

A problem with controlling the output power from an optical amplifier by only counting the number of channels, is that the number of channels is only a rough measure of the output power of the amplifier.

The purpose of the present invention is to solve these problems by using a feed-forward with a reading of the total optical input power to the amplifier. An output signal is formed as a non-linear function of this input power. The output signal then controls the amplifier, for example by controlling a pump laser which is coupled to the optical amplifier.

In order to increase the reliability it is possible in one embodiment of the invention to combine the feed-forward with negative feedback. This provides a rough adjustment with the feed-forward and a fine adjustment with the feedback.

The feedback is effected by measuring the optical channel output power and feeding it into a controller. There is also coupled to the controller a set value which indicates the desired channel output power. The controller emits a signal which is added or multiplied by the output signal from the feed-forward and controls the amplifier.

Measurement of the power in the channels can be done in various ways. Firstly, it is possible to count the number of channels, measure the total power in all of the channels and divide the power by the number of channels. Another method is to allocate one, or preferably two, channels solely for power measurement. In these channels, there will then essentially only be some type of known check signal, for example a pilot tone or a digital signal. The power is then measured only on these channels. Alternatively, the amplitude of the check signal can be measured. If several check signals are used, the mean value is taken.

The advantages of the present invention are that the measurements will be both rapid and reliable in an inexpensive and simple manner.

PREFERRED EMBODIMENTS

Figure 1:
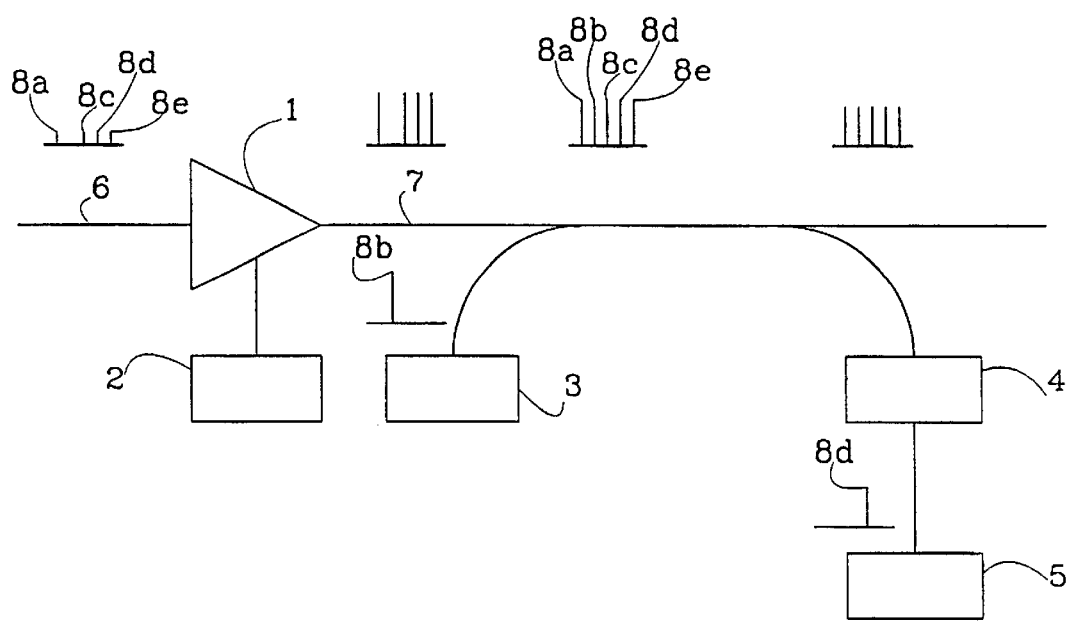
FIG. 1 shows schematically an optical system optimized for five channels according to the prior art.

FIG. 1 shows in accordance with prior art an optical system optimized for five channels 8a, 8b, 8c, 8d and 8e using wavelength division multiplexing. The system can be part of the telephone system for example. In the optical system, an optical amplifier 1 has constant output power. The amplifier 1 is controlled by a pump laser 2. An optical fibre 6 leads into the amplifier 1 from other nodes in the system and an optical fibre 7 leads from the amplifier 1 to other nodes in the system. In the fibres 6, 7 channels can be added and dropped. In the example shown, four channels 8a, 8c, 8d, 8e come through the first fibre 6 into the amplifier 1, are amplified and exit in the second fibre 7. An additional channel 8b is thereafter added from a transmitter 3. All of the channels 8a, 8b, 8c, 8d, 8e will then be of the same strength and one selected cannel 8d can be read by a filter 4 selecting the specific wavelength of the selected channel 8d and sending it on to a receiver 5. All of the channels 8a, 8b, 8c, 8d, 8e decrease in strength the farther they travel, but since they are of equal strength there is no problem in reamplifying them.

Figure 2:
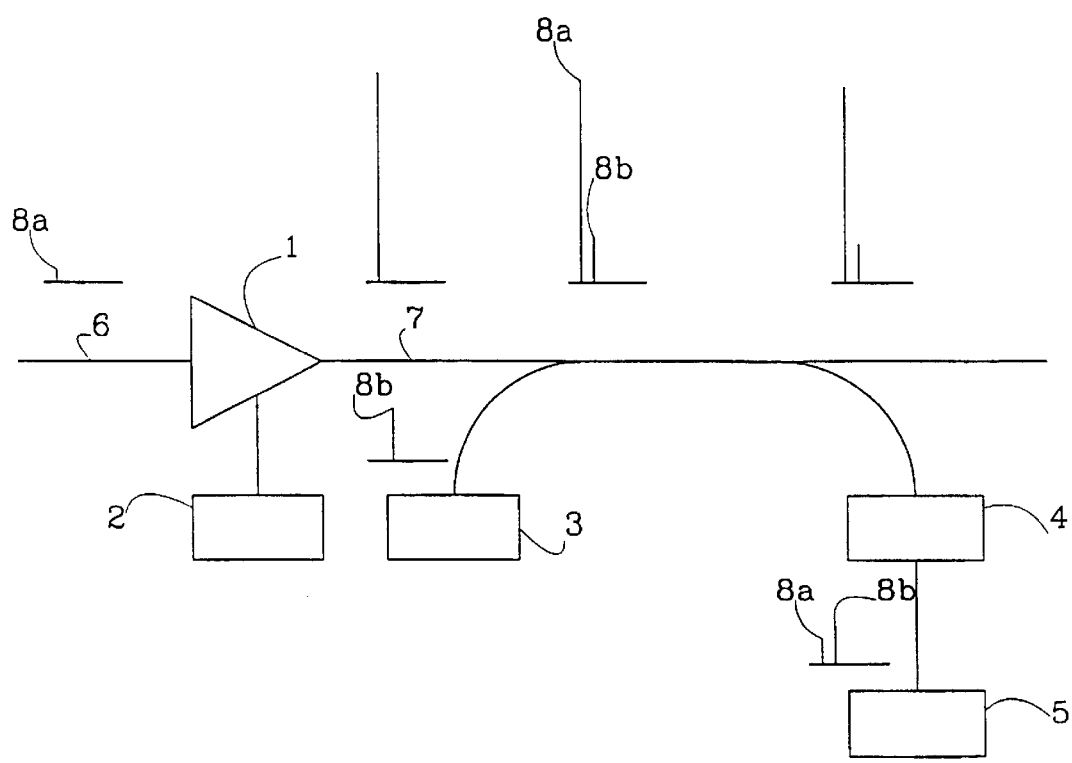
FIG. 2 shows schematically the same system as in FIG. 1 but with only two channels present.

FIG. 2 shows the same system as in FIG. 1. In this case, the system is still optimized for five channels, but only a first channel 8a comes into the amplifier 1. This single channel 8a will then become approximately four times as strong as if there had been four channels which had been amplified. This is due to the fact that the total output power from an optical amplifier is in principal constant, i.e. the output power depends actually primarily on the output power from the pump laser 2 coupled to the amplifier and less on the input power to the amplifier 1.

When a second channel 8b is then added the channels 8a and 8b will not be as strong, which results in problems. The filter 4 is in practice not ideal, so when the filter 4 attempts to select out the second channel 8b, the first channel 8a will predominate since it is so strong and cross talk can occur.

It is thus very desireable to be able to control the output power of the amplifier 1 channels.

Figure 3:
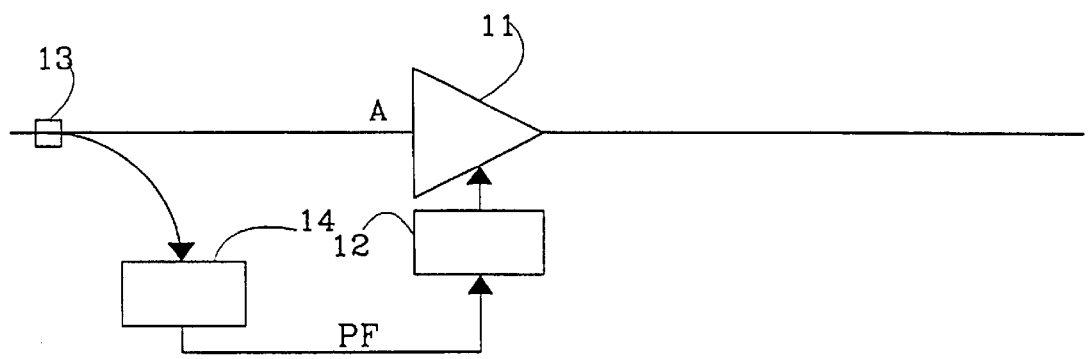
FIG. 3 shows schematically one embodiment of the invention.

Since the output effect from an optical amplifier depends primarily on the output power from the pump laser coupled to the amplifier, it is possible according to the invention to solve the above problems by controlling the pump laser in the manner shown in FIG. 3. An optical amplifier 11 is controlled by a pump laser 12. A first optical demultiplexor 13 reads the total optical power at the input of the amplifier 11 and senses the value to a feed-forward block 14. From the feed-forward block 14 a feed-forward process demand signal PF is sent which controls the amplifier 11 by controlling the output power of the pump laser 12.

The feed-forward block 14 provides a non-linear function of the total optical power and can be realised with the aid of an analogue non-linear network, for example. Another alternative is to solve it digitally by A/D converting the optical input power into an eight-bit-word, for example. This eight-bit-word can then be used by different values of the eight-bit-word indicating different memory addresses in a memory (see also the description in connection with FIG. 5 below).

To use in this manner feed-forward makes the control rapid, since disturbances can be corrected at once. Forward feed requires, however, much knowledge of the behaviour of the system since the result cannot be seen. It can be compared to driving a car blindfolded; one must know exactly how much to turn the wheel at each curve in order not to end up in the ditch.

Another problem is that pure feed-forward can require the optical input power to lie within a narrow range.

Figure 4:
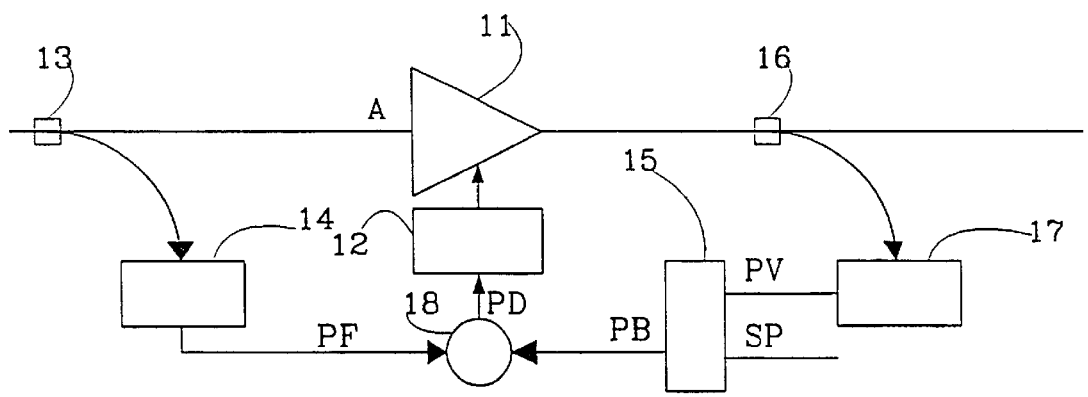
FIG. 4 shows schematically a second embodiment of the invention.

FIG. 4 shows a method of solving the problems. It is the same figure as in FIG. 3 but with negative feedback added. Negative feedback is reliable since the result is observed and adjustments are made thereafter. The disadvantage is that the automatic control cannot be effected however rapidly one may wish, since the control will then risk becoming unstable. In this case the optical amplifier also has a time constant of perhaps 5–10 ms, which sets a limit to how rapid the feedback control can be made. If one combines, however, the feedback with the feed-forward, a rapid rough adjustment is achieved with the aid of the feed-forward and a not so rapid fine adjustment is achieved with the aid of the feedback.

The feedback functions by measuring the output power of the optical amplifier 11 and providing a process value PV. In a controller 15 the process value PV is compared to the desired channel output power, i.e. a set point SP which, in accordance with the programming of the controller 15, emits a feedback process demand signal PB which controls, via the pump laser 12 the channel output power of the amplifier 11 so that it approaches the desired output. This adjustment does not of course take place instantaneously. When the feedback process demand signal PB via the pump laser 12, changes the channel output power of the amplifier 11, the conditions may already have been changed, which would require a new measurement of the channel output power of the amplifier 11, thus providing a new feedback process demand signal PB. This process takes place continually and a negative feedback control loop is created which, with a certain time delay, adjusts the output power of the amplifier 11 so that it is always in the vicinity of the desired value.

The controller 15 is a conventional PID controller (proportional-intergrating-differentiating). In short, the three different terms of the controller 15 can be summarized as follows: a large proportional tern results in increased speed of the controller, but also as a rule in decreased stability. The introduction of an intergral term eliminates lasting error in the output signal, but decreases the stability the larger the term is. The introduction of a differentiation term can improve the stability, but the diffierentiation of noisy measurement signals can be difficult. Careful weighing of said terms is required depending on what requirements one places on the control.

FIG. 4 also shows a combination means 18 which combines the feed-forward process demand signal PF with the feedback process demand signal PB and provides an output signal PD. In certain contexts, feed-forward and feedback are combined by addition. It would work in this case as well, but in this case it may be more advantageous to use multiplication since disturbances occur primarily when the number of channels is changed and the output power of the amplifier 11 is then changed proportionally to the number of the channels. The combination block 18 can thus be an adder or a multiplier, but also other combination functions are conceivable.

A number of wavelength channels goes through the amplifier 11. In at least one check signal channel, no data is transmitted, rather only a known check signal A is used to indicate the channel output power in the amplifier 11. The check signal A can be a pilot tone, a digital signal or any other signal thereof which can be checked. It is possible to select with advantage a signal A which can also be used for other purposes, for example as a protective signal.

After the amplifier 11, the check signal channel(s) with the check signal A is (are) read by an optical demultiplexor 16 and transferred to the detector block 17. The demultiplexor 16 can be a WDM coupler, a common opto-coupler or the like. A WDM coupler will, compared with a common opto-coupler, give a better signal to noise ratio from the detector block 17, since the data channels are deselected. In order to improve the signal to noise ratio when a common opto-coupler is used, an optical filter (not shown in the Figure) can be coupled in before the detector block 17.

There are different methods of reading the check signal A. One can either measure the top power on the check signal channel(s) or one can measure the amplitude on the check signal channel(s). in the latter case, a mean value of the amplitudes of several check signals is to be used. An additional method is to use a digital check signal A and read it. Different check signals A can of course be transmitted in different check signal channels.

Another method can be to modulate one or more check signals A on the signals in all channels and then measure the amplitude of the check signals A. This can, however, disturb the transmission of data in the channels and since the check signal amplitude in that case will be smaller, it can be more difficult to measure than if the check signal has its own channel.

As an advantageous variation, it is conceivable that if no check signal A is detected, for example in the event of a fault, then the latest value of the feedback process demand signal PB will be used until a new check signal A is detected.

As an alternative method of measuring the channel output power of the amplifier 11, it is also conceivable to not use any check signal at all, but instead to have a means for counting the channels and then measuring the total output power from the amplifier 11. The total output power is then divided by the number of channels. Merely counting the number of channels without at the same time measuring the output power only provides a rough measure of the output power of the amplifier 11.

On the basis of the information which the detector block 17 has obtained concerning the channel output power of the amplifier 11, a channel power dependent process value signal PV is then sent to the controller 15 which controls as above.

Figure 5:
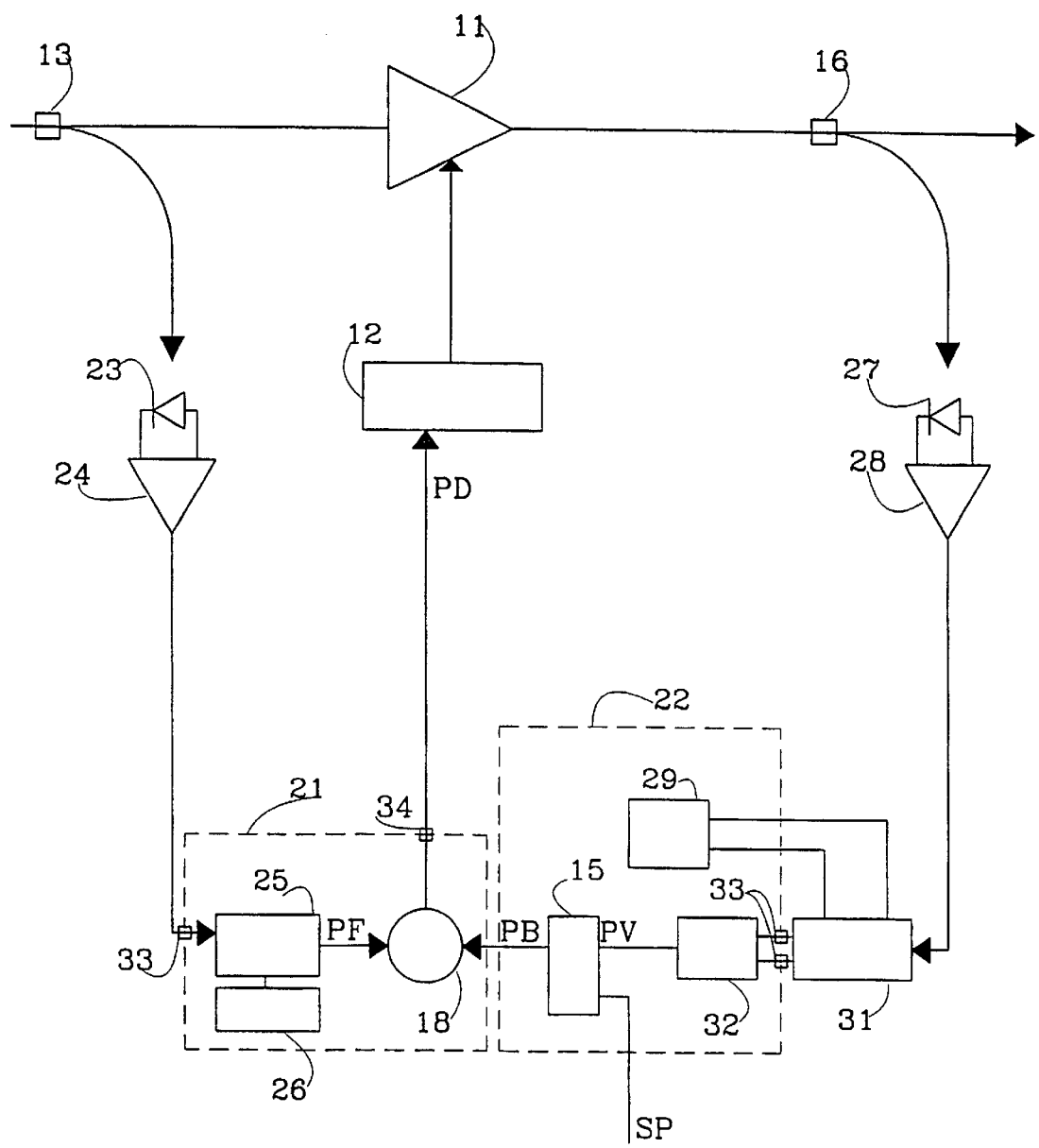
FIG. 5 shows a detailed picture showing certain details in FIG. 4.

FIG. 5 is a detail of FIG. 4 with the same designations and shows one example of how the invention can be implemented in more detail.

Certain portions of the regulation are implementated in two function blocks 21 and 22. The first function block 21 encompasses a feed-forward circuit 25, a memory 26 and the combination block 18. The feed-forward block 14 in FIG. 4 corresponds in FIG. 5 to a first photodiode 23, a logarithmic amplifier 24, the feed-forward circuit 25 and the memory 26. The logarithmic amplifier 24 can be linear instead, but as the total optical input power can vary within such a broad range, it may be more advantageous to use a logarithmic amplifier.

The second function block 22 in FIG. 5 comprises the controller 15, a detector 32 and a tone generator 29. The detector block 17 in FIG. 4 corresponds in FIG. 5 to a second photodiode 27, a linear amplifier 28, an amplitude measuring block 3 1, the detector 32, and the tone generator 29.

Analogue signals which are fed into the function blocks 21 and 22 pass via an A/D converter 33. In the same manner, digital signals emitted from the function blocks 21 and 22 proceed via an A/D converter 34.

The photodiodes 23 and 27 can for example be of the type PN (Positive-Negative) or PIN (Positive-Intrinsic-Negative).

The feed-forward in FIG. 5 functions in the following manner: the photodiode 23 reads the light which has been tapped the input of the amplifier 11 and which thus represents the total input power to the amplifier 11.

Via the logarithmic amplifier 24 and an A/D converter 23, the light is converted into an eight-bit-word for example which is fed into the feed-forward 25. How many bits are to be used is a question of weighing between precision (more bits) and speed (fewer bits). If the feed-forward is to be at all useful it should proceed relatively rapidly. Preferably, the feed-forward output signal should be applied within a few tenths of a $\mu$s.

The feed-forward circuit 25 calls the memory 26, which, depending on the eight-bit-word, tells the feed-forward circuit 25 which feed-forward process demand signal PF it is to feed out. The feed-forward process demand signal PF and a feedback process demand signal PB from the second function block are then fed into the combination block 18, which in turn emits an output signal PD, which is delivered via a DIA converter 34 to the pump laser 12, which then controls the amplifier. The pump laser 12 has a rapid control circuit (not shown) in order to control its output power. There are several known methods of achieving this.

In FIG. 5, the amplitude is measured on two check signals which in this case are pilot tones and which are sent in the same channel. Light is tapped from the output of the optical amplifier and is converted via the photodiode 27 and the linear amplifier 28 into a voltage which is fed into the amplitude measuring block 31.

The pilot tones can have frequencies lying between 50–60 kHz for example, separated by say 6 kHz. The tone generator 29 is used to provide reference signals for the amplitude measuring by feeding in two sine waves or the like with frequencies which are 2 kHz higher than the pilot tones, i.e. within the range 52–62 kHz to the amplitude measuring block 31. The frequency difference between the frequency of the pilot tone and the frequency of its corresponding reference signal will then be 2 kHz, but other frequencies can occur and should be filtered out.

The amplitude measuring block 31 comprises two band pass filters of approximately 2 kHz, and two amplitude meters, and in this manner the amplitudes of the two pilot tones are extracted. The result is A/D converted and fed into the detector 32, where the mean value of the two amplitudes is taken and an output power dependent process value signal PV is sent to the controller 15. The controller functions as described in FIG. 4 and emits the feedback process demand signal PB to the combination block 18 which, as described above, emits the process demand output signal PD which indirectly controls the output power of the optical amplifier 11.

What is claimed is:

1. Optical system comprising an optical amplifier, which includes at least one input and at least one output, and a control circuit for controlling the output power of the amplifier with the aid of a feed-forward process demand signal, said control circuit comprising:

a feed-forward block;

a first means for tapping light from the input of the amplifier to the feed-forward block, wherein the feed-forward measures the total optical input power;

controller means, a detector block and a second means for tapping light from the output of the amplifier to the detector block, wherein a process value signal is sent from the detector block to the controller means and wherein a set point signal is sent to the controller means where it is compared to the process value signal, a feedback process demand signal is sent from the controller means to a combination means, the feed-forward process demand signal is arranged to be sent to a combination means, and wherein the combination means emits an output signal which controls the amplifier.

2. Optical system according to claim 1, wherein the feed-forward process demand signal is formed as a non-linear function of the total optical input power.

3. Optical system according to claim 2, wherein the non-linear function is achieved by an analogue non-linear network.

4. Optical system according to claim 2, wherein the non-linear function is achieved by addressing to a memory.

5. Optical system according to claim 1, wherein the combination means is a multiplier.

6. Optical system according to claim 1, wherein the combination means is an adder.

7. Optical system according to claim 1, wherein the controller means comprises a controller with an input for a process value signal, an input for a set point signal and an output for the feedback process demand signal, wherein the process value signal is dependent on the channel output power of the amplifier and wherein the set point signal sets the desired channel output power from the amplifier.

8. Optical system according to claim 1, wherein the controller means is non-linear.

9. Optical system according to claim 1, wherein the optical system comprises a means for counting the number of channels which pass through the amplifier, wherein the detector block measures the total output power on all channels and wherein the process value signal is formed on a basis of the total power divided by the number of channels.

10. Optical system according to claim 1, wherein at least one check signal is modulated on other signals in at least one channel.

11. Optical system according to claim 1, wherein the process value signal is formed in the detector block on the basis of at least one check signal, which is sent in at least one wavelength channel separately arranged for this purpose in the system and which is sent through the amplifier.

12. Optical system according to claim 10, wherein the detector block measures the total power on the channel.

13. Optical system according to claim 10, wherein the detector block measures the amplitude on the channel.

14. Optical system according to claim 1, wherein the output power of the optical amplifier is controlled indirectly by the output signal whereby the amplifier is controlled by a pump laser and whereby the pump laser is controlled by the output signal.

15. Process, with the aid of a feed-forward process demand signal, for controlling the output power of an optical amplifier, which comprises at least one input and at least one output, by using a control circuit comprising a feed-forward block and a first means for tapping light from the input of the amplifier to the feed-forward block, wherein the control circuit also encompasses a controller means, a detector block and other means for tapping light from the output of the amplifier to the detector block, the process comprising the steps of:

tapping light from the input of the amplifier to the feed-forward block;

measuring the total optical input power to the amplifier;

forming as a non-linear function of the input power the feed-forward process demand signal;

sending a process value signal from the detector block to the controller;

sending a set point signal to the controller block where it is compared with the process value signal;

sending a feedback process demand signal from the controller to a combination means;

sending the feed-forward process demand signal to the combination means; and emitting by the combination means an output signal which controls the amplifier.

16. Process according to claim 15, wherein the combination means multiplies.

17. Process according to claim 15, wherein the combination means adds.

18. Process according to claim 15, further comprising the steps of:

counting the number of channels passing through the amplifier;

measuring the total output power; and forming the process value signal on the basis of the total power divided by the number of channels.

19. Process according to claim 15, further comprising the steps of:

sending at least one check signal in at least one separately arranged wavelength channel, wherein the wavelength channel is sent through the amplifier; and measuring the total power in this wavelength channel is measured.

20. Process according to claim 15, further comprising the steps of:

sending at least one check signal in at least one separately arranged wavelength channel, wherein the wavelength channel passes through the amplifier; and measuring the amplitude in the wavelength channel.

21. Process according to claim 15, wherein the output signal controls the amplifier by controlling a pump laser, which controls the amplifier.

22. An optical system comprising an optical amplifier, which includes at least one input and at least one output, and a control circuit for controlling the output power of the amplifier with the aid of a feed-forward process demand signal, said control circuit comprising:

a feed-forward block;

a first means for tapping light from the input of the amplifier to the feed-forward block, wherein the feed-forward measures the total optical input power;

controller means, a means for counting the number of channels which pass through the amplifier, a second means for tapping light from the output of the amplifier to a detector block, wherein the detector block measures the total output power on all channels and wherein a process value signal is formed on the basis of the channel output power, wherein the process value signal is sent from the detector block to the controller means and wherein a set point signal is sent to the controller means where it is compared to the process value signal, a feedback process demand signal is sent from the controller means to a combination means, the feed-forward process demand signal is arranged to be sent to a combination means, and wherein the combination means emits an output signal which controls the amplifier.

23. A process, with the aid of a feed-forward process demand signal, for controlling the output power of an optical amplifier, which comprises at least one input and at least one output, by using a control circuit comprising a feed-forward block and a first means for tapping light from the input of the amplifier to the feed-forward block, wherein the control circuit also encompasses a controller means, a detector block and other means for tapping light from the output of the amplifier to the detector block, the process comprising the steps of:

tapping light from the input of the amplifier to the feed-forward block;

measuring the total optical input power to the amplifier;

forming as a non-linear function of the input power the feed-forward process demand signal;

measuring the total output power;

forming a process value signal on the basis of the channel output power;

sending the process value signal from the detector block to the controller;

sending a set point signal to the controller block where it is compared with the process value signal;

sending a feedback process demand signal from the controller to a combination means;

sending the feed-forward process demand signal to the combination means; and emitting by the combination means an output signal which controls the amplifier.

* * * * *